(12) United States Patent
Lauk

(10) Patent No.: US 6,940,194 B1
(45) Date of Patent: Sep. 6, 2005

(54) ELECTRIC DRIVE UNIT

(75) Inventor: Detlef Lauk, Renchen (DE)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 09/889,309

(22) PCT Filed: Nov. 14, 2000

(86) PCT No.: PCT/DE00/04020

§ 371 (c)(1),
(2), (4) Date: Oct. 22, 2001

(87) PCT Pub. No.: WO01/37399

PCT Pub. Date: May 25, 2001

(30) Foreign Application Priority Data

Nov. 16, 1999 (DE) .......................................... 199 54 966

(51) Int. Cl.[7] .............................................. H20K 9/00
(52) U.S. Cl. .............................. 310/90; 310/83; 310/89; 310/75 R; 310/154; 74/425
(58) Field of Search .............................. 310/90, 83, 89, 310/75 R, 40, 154, 44, 40 MM; 74/425

(56) References Cited

U.S. PATENT DOCUMENTS

| 4,572,979 | A |   | 2/1986 | Haar et al. |
| 5,184,039 | A |   | 2/1993 | Kraft |
| 5,881,823 | A | * | 3/1999 | Kabatnik ..................... 173/217 |
| 5,925,962 | A | * | 7/1999 | Kobman ..................... 310/237 |
| 5,942,827 | A |   | 8/1999 | Neumann et al. |
| 6,058,594 | A |   | 5/2000 | Neumann et al. |
| 6,286,199 | B1 | * | 9/2001 | Bobay ......................... 29/596 |

FOREIGN PATENT DOCUMENTS

| DE | 196 14 217 A1 | 10/1997 |
| GB | 2014371 | 8/1979 |
| GB | 1 596 374 A | 8/1981 |
| WO | WO 98 10971 A | 3/1998 |

* cited by examiner

Primary Examiner—Darren Schuberg
Assistant Examiner—Iraj A. Mohandesi
(74) Attorney, Agent, or Firm—Ronald E. Greigg

(57) ABSTRACT

The invention relates to an electric drive unit having an electric motor, a gear, a gear housing, and a pole housing. A number of parts of the electric drive unit (1) and the production cost are both reduced by the integral embodiment of the gear housing (5) and pole housing (10) and by injection molding the short-circuit element (36) and magnet (32) into the pole housing (10). Such an electric drive unit (1) is used in windshield wiper motors or control motors in the automotive field.

26 Claims, 3 Drawing Sheets

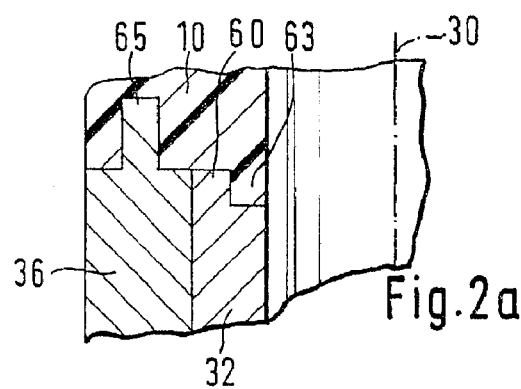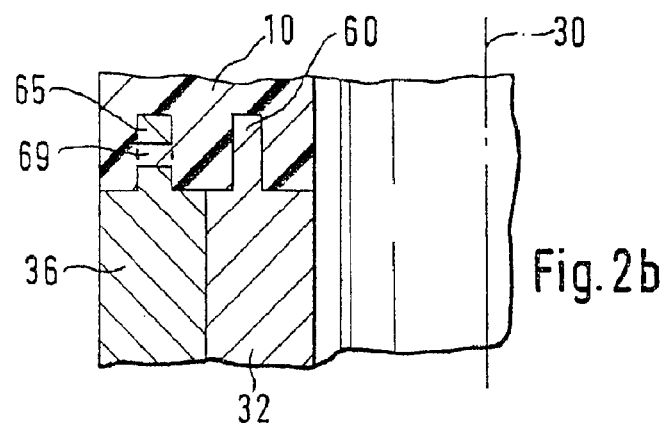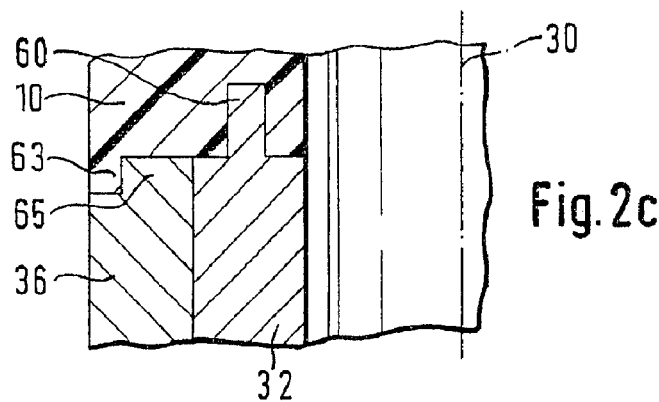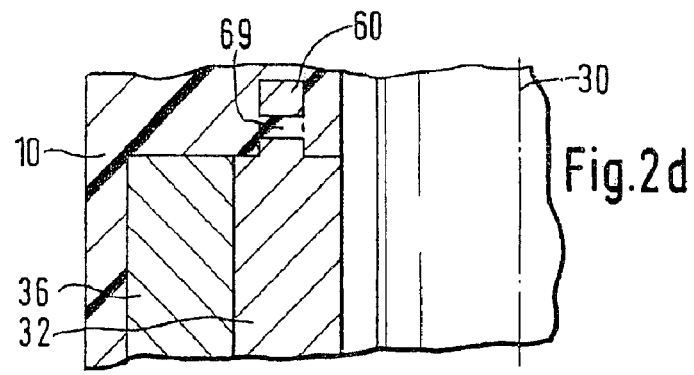

ELECTRIC DRIVE UNIT

CROSS-REFERENCE TO RELATED APPLICATIONS

This application is a 35 USC 371 application of PCT/DE 00/04020 filed on Nov. 14, 2000.

BACKGROUND OF THE INVENTION

1. Field of the Invention

The invention is directed to an electric drive unit and particularly to such drive units useful in motor vehicles.

2. Description of the Prior Art

From German patent disclosure DE 32 35 622 A1 and U.S. Pat. No. 4,572,979, a design of an electric drive unit is known. Among other elements, it comprises an electric motor with a stator and a magnet in a pole housing, a rotor with an armature, and a gear in a gear housing. The pole housing and gear housing are joined together, making for a high number of parts to be assembled and high production costs.

The gear housing is made from plastic.

In the prior art, the motor housing either has a pole piece or is a pole housing that takes the form of a cup of a magnetically conductive material and thus acts as a pole piece. In both cases, two magnetic half shells are mounted on the inside in the housing. They are partly fixed by retention springs in the pole housing and/or, because of the incident vibration and also to reduce noise, they are adhesively bonded between the magnet and the pole housing.

The pole pot bottom contains a cylindrical or homelike bearing, which acts as a radial bearing for supporting the rotor.

After their manufacture, these parts, comprising an electric motor, magnet and bearing, exist in the form of separate components or a component group that have to be connected to the gear housing by screws or wedging.

Often, to reduce the longitudinal armature play, a spacer is also mounted between a face end of the rotor and a bearing in the pole housing, in order to compensate for tolerances of the rotor and pole housing.

From German patent disclosure DE 43 20 005 A1 and U.S. Pat. No. 5,895,207, it is already known to make the pole housing of an electric drive unit of plastic and for the magnets to be retained in the plastic. However, the gear housing and the pole housing are screwed together.

From German patent disclosure DE 197 24 920 A1, it is already known to accommodate a motor and a substantial portion of the gear in one housing. A separate gear housing is always still necessary, however. Furthermore, this reference provides no information about how the motor is accommodated in the housing or what material comprises the housing.

SUMMARY OF THE INVENTION

The electric drive unit of the invention has the advantage over the prior art that in a simple way, the number of parts to be assembled and the production cost are reduced.

The use of plastic for the housing is advantageous, because in this way, watertight pole and gear housings can be produced, and the weight of the drive unit can be reduced.

It is especially advantageous for magnets and/or a pole piece and/or an armature bearing to be injected into the pole housing, since this reduces the production cost and the number of parts to be assembled.

The use of a one-piece pole piece has advantages because it reduces the number of parts to be assembled.

It is also advantageous in the event of corrosion problems to spraycoat the pole piece with plastic on the outside.

By positive and nonpositive engagement, the at least one magnet or the pole piece can advantageously be secured in the pole housing, so that no further securing elements are necessary.

It is advantageous to keep the longitudinal armature play very slight by the insertion of an end shield with the motor bearing after a shaft has been installed.

BRIEF DESCRIPTION OF THE DRAWINGS

Other features and advantages of the invention will become apparent from the detailed description contained below, taken in conjunction with the drawings, in which:

FIGS. 2a–e show various possible ways of integrating the at least one magnet and the pole piece into the pole housing.

DESCRIPTION OF THE PREFERRED EMBODIMENTS

Figure 1:
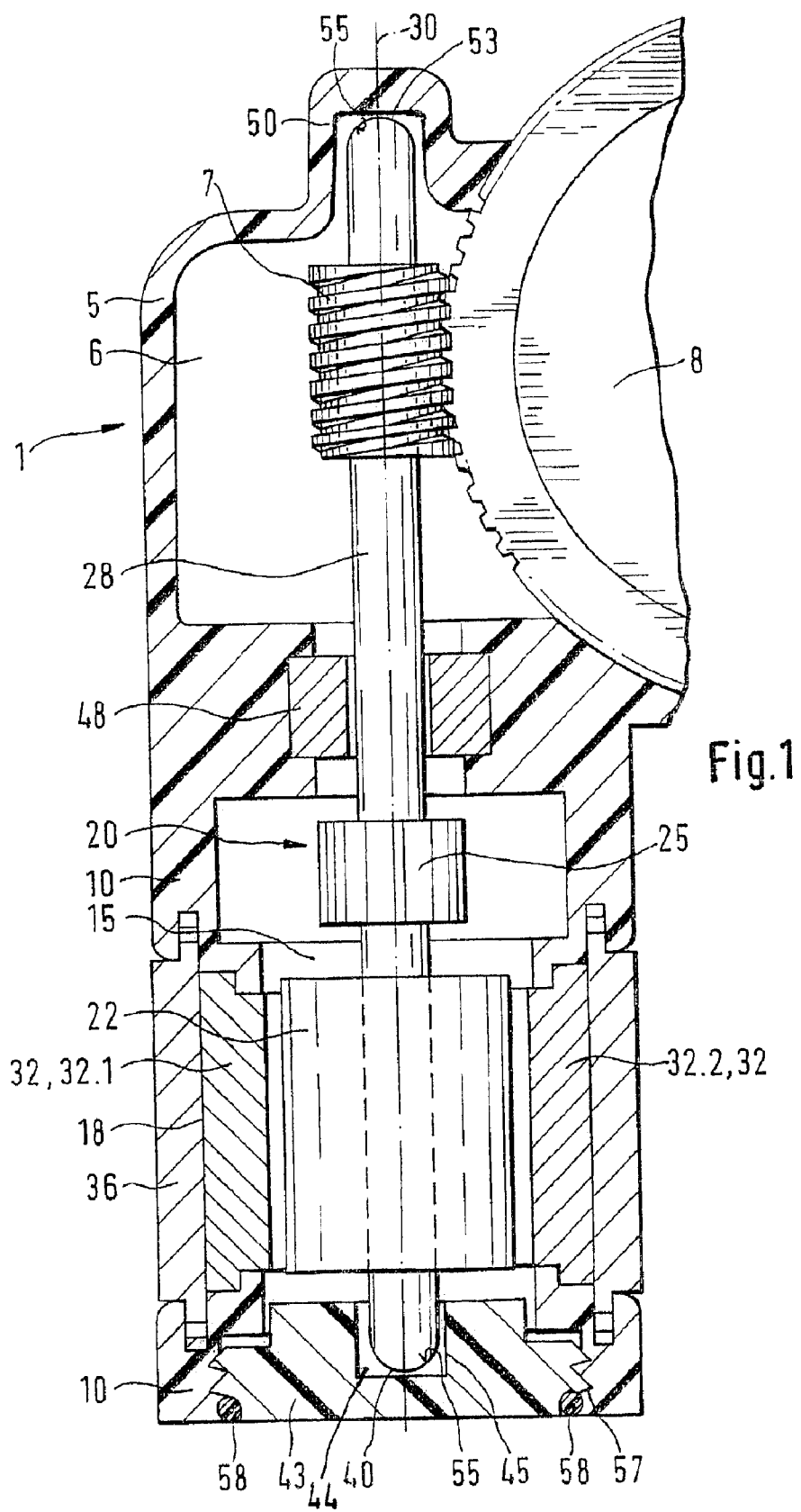
FIG. 1 shows a first exemplary embodiment of a drive unit embodied according to the invention.

FIG. 1 shows a first exemplary embodiment of an electric drive unit 1 according to the invention. The electric drive unit 1 comprises a gear housing 5 and a pole housing 10. The gear housing 5 merges without any additional connection with the pole housing 10, and the gear housing 5 can also be in multiple parts. For instance, a cap, not shown, and a bottom 6 can form the gear housing 5. The installation of a gear and optionally the installation of a bearing in the gear housing 5 is thus made possible because the cap is mounted later. The bottom 6 of the gear housing 5 in this example is in one piece with the pole housing 10. The gear housing 5 and the pole housing 10 can be of plastic or metal. If a housing 5, 10 is of plastic, then it is produced for instance by plastic injection or plastic casting. A pole housing 10 of plastic can also be injection-molded onto a metal gear housing 5, so that any combination of materials is possible for the housings 5, 10. A worm drive 7, for instance, with a gear 8 not otherwise shown is located in the gear housing 5.

An electric motor 15 is located in the pole housing 10. The electric motor 15 comprises a stator 18 and a rotor 20. The rotor 20 is formed of an armature 22, a commutator 25, and a shaft 28. The shaft has a longitudinal axis 30.

The stator 18 comprises a magnet 32 and a pole piece 36. The magnet 32 can be in one piece or can comprise multiple parts 32.1, 32.2.

The pole piece 36 can comprise two steel half-shells, for instance, or be in one piece, for instance comprising a steel ring, and can thus form the magnetic short circuit for the magnets 32. The pole piece 36 can be made from any magnetically conductive material.

This may also be a mixture of plastic and a magnetically conductive material that is injected into the pole housing 10.

The at least one magnet 32 and the pole piece 36 are integrated with the pole housing 10.

The shaft 28 is supported at at least two points. On an end 40 of the shaft 28 toward the motor, an end shield 43 with a motor bearing 45 is present which initially is still axially adjustable. The end shield 43 and the motor bearing 45 can be embodied in one piece and can for instance be of plastic. The end shield 43 can also comprise a metal motor bearing 45 spray-coated with plastic. One indentation 44, for example, is provided in the pole housing 10, and the end 40 of shaft 28 can be introduced into this indentation.

Downstream of the electric motor 15, viewed in the direction of the gear housing, and in this case downstream of the commutator 25, for example, there is an armature bearing 48 which is injected for instance into the pole housing 10. A further bearing, a so-called gear bearing 50, is located on an end 53, toward the gear, of the shaft 28 in the gear housing 5. The end 53 toward the gear and the end 40 toward the motor of the shaft 28 are shaped as a run-up cup 55, for instance.

In the production of the electric drive unit 1, magnets 32 (32.1, 32.2) and pole pieces 36, for instance, are placed in an injection molding tool and then, by injection of plasticized plastic into the injection-molding tool, the bottom 6 of the gear housing 5 and the pole housing 10 are formed.

After the assembly of the rotor 20, gear 8, and so forth, the end shield 43 with the motor bearing 45 is inserted into the pole housing 10 axially in such a way that the longitudinal armature play is minimal. Shims to compensate for tolerances of the shaft and housings are unnecessary.

The end shield 43 can for instance be screwed into a thread 57 present in the pole housing 10, or glued by a bead of adhesive, or joined to the pole housing 10 by ultrasonic welding or lasers. All this produces a watertight connection.

Given a suitable choice of material for the end shield 43, the motor bearing 45 can not only perform radial support but can also absorb the axial run-up forces of the rotor 20. Furthermore, the end shield 43 with the motor bearing 45 can be pressed axially with slight prestressing force against a steel run-up cup 55 of the shaft 28 and be fixed to the pole housing 10 in an axially play-free state of the shaft 28.

FIGS. 2a through 2e show various possible ways of integrating the at least one magnet 32 and the pole piece 36 into the pole housing 10. The same reference numerals as in FIG. 1 will be used for the same or identically functioning parts.

FIG. 2a shows that the magnet 32 has a first protrusion 60, which rests on a second protrusion 63, toward the rotor 20, of the pole housing 10 and thus forms a positive engagement with the plastic. The pole housing 10 is injection-molded for instance, around a third protrusion 65 of the pole piece 36, which is thus secured in the pole housing 10. The other ends of the magnet 32 and of the pole piece 36 are embodied similarly and are surrounded by the pole housing 10. The short-circuit element 36 and the magnet 32 rest tightly against one another, creating a nonpositive engagement for the magnet 32, which is retained on the second protrusion 63 of the pole housing 10.

FIG. 2b shows the magnet 32 with a first protrusion 60, which as in the case of the pole piece 36 in FIG. 2a protrudes into the pole housing 10 and is surrounded by plastic. In its plastic-surrounded third protrusion 65, the pole piece 36 has an opening 69, into which plastic penetrates in an injection-molding operation, for instance, and thus additionally secures the short-circuit element 36 in the pole housing 10. In this example, an additional nonpositive engagement for the magnet 32 or the pole piece 36 is not necessary.

In FIG. 2c, the pole piece 36 rests with its third protrusion 65 on one side on a second protrusion 63 on a circumference of the pole housing 10, so that it forms a positive engagement with the plastic. The magnet 32 has a first protrusion 60, which protrudes into the pole housing 10 and radially secures the pole piece 36 by nonpositive engagement.

FIG. 2d shows how the pole housing 10 on the outside surrounds the circumference of the pole piece 36, for instance completely, and that the pole piece 36 has no protrusion and is secured in its position by positive engagement by the pole housing 10 and nonpositive engagement by the magnet 32. The magnet 32, as in FIG. 2b, is injected with the first protrusion 60 into the pole housing 10 and is provided with an opening 69 in the first protrusion 60.

The protrusions 60, 63, 65 extend completely or partially all the way around radially on at least one end face of the magnet 32 or of the pole piece 36.

Figure 2E:
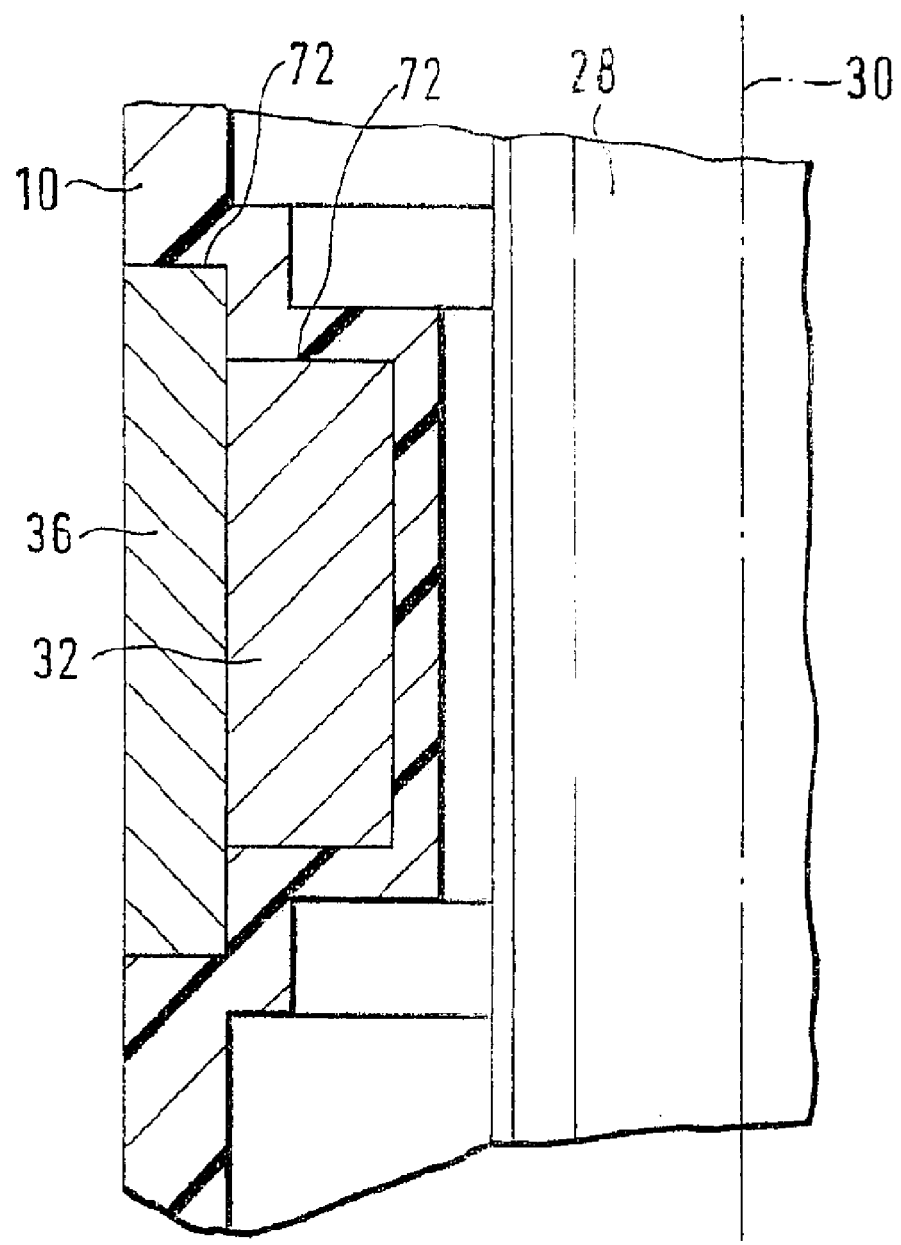

The pole housing 10 can also be produced directly, without injection of the magnet 32 and the pole piece 36. Then, as shown in FIG. 2e, the pole housing has recesses 72, for instance of stepped design, into which the magnet 32 and the pole piece 36 are inserted, located one above the other and secured. The plastic of the pole housing 10 surrounds the magnet 32 and the pole piece 36 completely toward the rotor 20. This increases a minimal spacing between the armature 20 and the magnet 32.

In FIGS. 2a, b, c and e, the pole piece 36 is exposed on the outside, for the sake of better heat radiation. If corrosion has to be avoided, then this is done either by a suitable choice of material, or as in FIG. 2d, by spray-coating the outside of the pole piece 36.

To achieve a good, tight binding of the pole piece or pole pieces 36 to the pole housing 10, an appropriate peripheral region of the pole pieces 36 can be embodied in perforated or ribbed fashion, for instance. Vibration between the magnet 32 and the short-circuit element 36 cannot occur, since both the magnet 32 and/or the pole piece 36 are injected firmly into the pole housing or secured firmly in it.

In general, the described design is suitable for achieving watertight electric drive units, because the already tight plastic gear housing can also be welded in watertight fashion toward the gear to a plastic cap. The foregoing relates to preferred exemplary of embodiments of the invention, it being understood that other variants and embodiments thereof are possible within the spirit and scope of the invention, the latter being defined by the appended claims.

What is claimed is:

1. An electric drive unit (1), in particular for drives in a motor vehicle, comprising
   an electric motor (15), having a rotor (20) with a shaft (28) and a pole housing (10),
   said pole housing (10) including an end shield (43), a motor bearing (45) for the rotor (20), and at least one magnet (32) and a pole piece (36), and
   a one- or multi-part gear housing (5), connected to said pole housing (10), said one- or multi-part gear housing houses a worm gear
   said pole housing (10) being integral with at least one part of said gear housing (5).

2. An electric drive unit (1), in particular for drives in a motor vehicle, comprising
   an electric motor (15), having a rotor (20) with a shaft (28) and a pole housing (10),
   said pole housing (10) including an end shield (43), a motor bearing (45) for the rotor (20), and at least one magnet (32) and a pole piece (36), and
   a gear housing (5), connected to said pole housing (10),
   said pole housing (10) being formed as one piece with at least one part of said gear housing (5), wherein
   the pole piece (36), comprising a mixture of plastic and magnetically conducted material, is at least partly surrounded by the material of the pole housing (10).

3. An electric drive unit (1), in particular for drives in a motor vehicle, including:

an electric motor (15), having a rotor (20) with a shaft (28) and a pole housing (10), said pole housing (10) including at least one magnet (32), a pole piece (36), and an end shield (43) integrally containing a motor bearing (45) for the rotor (20), a one- or multi-part gear housing (5), which is connected with the pole housing (10), said gear housing houses a worm gear said pole housing (10) being in one piece with at least one part of said gear housing (5), the drive unit characterized in that:

the end shield (43) is a part of the pole housing (10), and the at least one magnet (32) rests in part directly against the pole housing (10) and is held at least in part directly by the pole housing (10).

4. The electric drive unit of claim 3, wherein the pole housing (10) is formed at least partly of plastic.

5. The electric drive unit of claim 4, wherein the at least one magnet (32) is at least partly surrounded by the material of the pole housing (10).

6. The electric drive unit of claim 5, wherein the pole piece (36) forming a short circuit for the at least one magnet (32) is at least partly surrounded by the material of the pole housing (10).

7. The electric drive unit of claim 6, wherein the pole piece (36) is embodied in one piece.

8. The electric drive unit of claim 5, wherein the pole piece (36) comprises at least two shells.

9. The electric drive unit of claim 4, wherein the pole piece (36), comprising a mixture of plastic and magnetically conducted material, is at least partly surrounded by the material of the pole housing (10).

10. The electric drive unit of claim 4, wherein in the pole housing (10), the at least one magnet (32) is secured by engagement against a shoulder formed in the plastic of the pole housing (10) and by engagement with the pole piece (36) located radially outward.

11. The electric drive unit of claim 4, wherein in the pole housing (10), the pole piece (36) is secured by engagement against a shoulder formed in the plastic of the pole housing (10) and by engagement with the radially inner magnet (32).

12. The electric drive unit of claim 3, wherein the at least one magnet (32) is at least partly surrounded by the material of the pole housing (10).

13. The electric drive unit of claim 12, wherein the at least one magnet (32) has a protrusion (60) that is surrounded by plastic which comprises the pole housing (10).

14. The electric drive unit of claim 3, wherein the pole piece (36) forming a short circuit for the at least one magnet (32) is at least partly surrounded by the material of the pole housing (10).

15. The electric drive unit of claim 14, wherein the pole piece (36) has a protrusion (65), which is surrounded by plastic which comprises the pole housing (10).

16. The electric drive unit of claim 3, wherein the at least one magnet (32) has a protrusion (60) that is surrounded by plastic which comprises the pole housing (10).

17. The electric drive unit of claim 3, wherein in the pole housing (10), the at least one magnet (32) is secured in place by engagement against a shoulder formed in plastic which comprises the pole housing (10) and by engagement with the pole piece (36) located radially outward.

18. The electric drive unit of claim 3, wherein in the pole housing (10), the pole piece (36) is secured by engagement against a shoulder formed in plastic which comprises the pole housing (10) and by engagement with the radially inner magnet (32).

19. The electric drive unit of claim 3, wherein the end shield (43) is embodied in one piece with the motor bearing (45), and the end shield (43) is insertable into the pole housing (10).

20. The electric drive unit of claim 3, wherein the rotor (20) has an axial longitudinal axis (30), and the end shield (43) for the rotor (20) is disposed, axially positionably, on the pole housing in order to adjust the longitudinal play of the armature.

21. The electric drive unit of claim 20, wherein the end shield (43) is secured to the pole housing (10) by adhesive bonding.

22. The electric drive unit of claim 20, wherein the end shield (43) is secured to the pole housing (10) by ultrasonic welding.

23. The electric drive unit of claim 20, wherein the end shield (43) is secured to the pole housing (10) by a heat treatment.

24. The electric drive unit of claim 3, wherein the shaft (28) is supported, oriented toward the gear housing (5), in an armature bearing (48) which is at least partly surrounded by the material of the pole housing (10).

25. An electric drive unit (1), in particular for drives in a motor vehicle, comprising an electric motor (15), having a rotor (20) with a shaft (28) and a pole housing (10), said pole housing (10) including an end shield (43), a motor bearing (45) for the rotor (20), and at least one magnet (32) and a pole piece (36), and a one- or multi-part gear housing (5), said one- or multi-part gear housing houses at least one gear, said pole housing (10) being in one piece with at least one part of said gear housing (5).

26. An electric drive unit (1), in particular for drives in a motor vehicle, comprising an electric motor (15), having a rotor (20) with a shaft (28) and a pole housing (10), said pole housing (10) including an end shield (43), a motor bearing (45) for the rotor (20), and at least one magnet (32) and a pole piece (36), and a one- or multi-part gear housing (5), said pole housing (10) being in one piece with at least one part of said gear housing (5), at least one of said at least one magnets or said pole piece being insert molded in place within said pole housing.

* * * * *